United States Patent
Chen

(10) Patent No.: US 10,998,762 B1
(45) Date of Patent: May 4, 2021

(54) DIMMING METHOD, DIMMER, DIMMING EMERGENCY INVERTER AND EMERGENCY LIGHTING SYSTEM

(71) Applicant: Phenix Lighting (Xiamen) Co., Ltd., Xiamen (CN)

(72) Inventor: Jin Chen, Xiamen (CN)

(73) Assignee: PHENIX LIGHTING (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 16/804,035

(22) Filed: Feb. 28, 2020

(30) Foreign Application Priority Data

Jan. 19, 2020 (CN) .......................... 202010062164.2

(51) Int. Cl.
| | | |
|---|---|---|
| *H02J 7/00* | (2006.01) | |
| *H02J 9/06* | (2006.01) | |
| *H05B 45/10* | (2020.01) | |
| *H05B 47/19* | (2020.01) | |
| *H05B 47/00* | (2020.01) | |
| *H05B 47/10* | (2020.01) | |
| *H05B 47/105* | (2020.01) | |
| *H05B 47/18* | (2020.01) | |

(52) U.S. Cl.
CPC ............ *H02J 9/065* (2013.01); *H02J 7/0024* (2013.01); *H05B 45/10* (2020.01); *H05B 47/00* (2020.01); *H05B 47/10* (2020.01); *H05B 47/105* (2020.01); *H05B 47/18* (2020.01); *H05B 47/19* (2020.01)

(58) Field of Classification Search
CPC ........ H02J 9/065; H02J 7/0024; H05B 47/19; H05B 47/18; H05B 47/10; H05B 45/10; H05B 47/105
See application file for complete search history.

(56) References Cited

U.S. PATENT DOCUMENTS

| | | | |
|---|---|---|---|
| 2015/0021988 A1* | 1/2015 | Barnetson | H05B 45/00 307/23 |
| 2015/0108896 A1* | 4/2015 | Gordin | H05B 47/10 315/86 |
| 2017/0033598 A1 | 2/2017 | Shen et al. | |
| 2017/0244278 A1* | 8/2017 | Luk | H05B 45/31 |

* cited by examiner

*Primary Examiner* — Anh Q Tran
(74) *Attorney, Agent, or Firm* — Bayramoglu Law Offices LLC

(57) ABSTRACT

The present disclosure provides a dimming method and a dimmer. In the dimming method, when a mains power state is switched to an emergency state, a dimming ratio K is used to perform dimming control on a load unit; the dimming ratio K is calculated as follows: $K=P_{source}/P_{load}$. The dimmer includes: an emergency power source power acquisition module, configured to acquire an output power $P_{source}$ of an emergency power source; a load unit power acquisition module, configured to acquire a power $P_{load}$ of a load unit in a mains power state; and a dimming signal generation module, configured to acquire a dimming ratio according to $K=P_{source}/P_{load}$ when the mains power state is switched to an emergency state, generate a dimming signal according to the dimming ratio K, and output the dimming signal to the load unit. The present disclosure also provides a dimming emergency inverter and an emergency lighting system.

19 Claims, 9 Drawing Sheets

DIMMING METHOD, DIMMER, DIMMING EMERGENCY INVERTER AND EMERGENCY LIGHTING SYSTEM

CROSS REFERENCE TO RELATED APPLICATIONS

This application is based upon and claims priority to Chinese Patent Application No. 202010062164.2, filed on Jan. 19, 2020, the entire contents of which are incorporated herein by reference.

FIELD OF THE INVENTION

The present disclosure belongs to the technical field of emergency lighting, and particularly relates to a dimming method, as well as a dimmer, a dimming emergency inverter and an emergency lighting system, to which the dimming method is applied.

BACKGROUND OF THE INVENTION

In normal situations, lighting systems of office buildings, residences and the like are powered by the mains power. When the mains power is suddenly cut off, especially in emergencies such as fire, in order to ensure that people can be evacuated in an orderly manner, the lighting system will be switched to an emergency power supply system immediately after the mains power supply is cut off. At present, there are many researches on emergency power supply systems, involving the configuration of the power as supplied and the switching to emergency power supply mode.

Most emergency lighting systems in the related art are not equipped with a dimming function. In an emergency state, when an emergency power source such as a generator or an inverter supplies power to an emergency lighting device, the full power of the emergency lighting device must be output. However, only a small part of the power of normal lighting are required by specifications, regulations and actual demand in order to meet the requirement of emergency lighting, so a lot of generator power will be wasted or the battery capacity in the inverter will be increased, thereby resulting in considerable energy consumption of the emergency system, volume increase, and cost waste, and limiting the number of emergency lighting devices powered by the emergency power source.

As to very few emergency lighting technologies equipped with the dimming function, they also have some shortcomings and limitations.

U.S. Patent Publication No. US20170033598A1 discloses an emergency inverter, in which an output power of the inverter is detected when a mains power state is switched to an emergency state, and at the same time, a dimming signal is output from low to high according to a dimming ratio until the output power of the inverter reaches its rated power. This takes a certain period of time, and in practice, at the instant when the mains power state is just switched to the emergency state, the demand for the lighting state is more important; in addition, this technology cannot be used in emergency lighting systems powered by other emergency power sources such as generators and other inverters.

Based on the above analysis, existing dimming solutions in emergency power supply need to be improved and perfected, and the present solution is developed accordingly.

SUMMARY OF THE INVENTION

An object of the present disclosure is to provide a dimming method, a dimmer, a dimming emergency inverter, and an emergency lighting system, which can provide a dimming solution at the instant when a mains power state is switched to an emergency state, shorten a response time of dimming, and improve the effect of emergency lighting.

In order to achieve the above object, the following solutions are provided by the present disclosure:

a dimming method, in which when a mains power state is switched to an emergency state, a dimming ratio K is used to perform dimming control on a load unit;

wherein the dimming ratio K is calculated as follows: $K = P_{source}/P_{load}$;

wherein $P_{source}$ is an output power of an emergency power source, and $P_{load}$ is the power of the load unit acquired in the mains power state.

The above $P_{source}$ is an artificially set value, a rated output power of the emergency power source or an actual output power of the emergency power source. The rated output power of the emergency power source is acquired through a nominal value of the emergency power source, or through wired/wireless communication with the emergency power source. The actual output power of the emergency power source is acquired through wired/wireless communication with the emergency power source.

The above $P_{load}$ is an actual power of the load unit, and is acquired through detection in the mains power state, or acquired through wired/wireless communication with the load unit.

The above $P_{load}$ is a maximum actual power of the load unit in the mains power state, and is acquired through detection.

The above load $P_{load}$ is a rated power of the load unit, and is acquired through wired/wireless communication with the load unit.

The specific method of using the dimming ratio K to perform dimming control on the load unit is: generating a dimming signal according to the dimming ratio K to control the load unit.

The dimming signal is a TriAC, PWM, 0-10V, Dali or DMX dimming signal.

A dimmer, configured to dim a load unit powered by an emergency power source in an emergency state and including:

an emergency power source power acquisition module, configured to acquire an output power $P_{source}$ of an emergency power source;

a load unit power acquisition module, configured to acquire a power $P_{load}$ of a load unit in a mains power state; and a dimming signal generation module, configured to acquire a dimming ratio according to $K = P_{source}/P_{load}$ when the mains power state is switched to an emergency state, generate a dimming signal according to the dimming ratio K, and output the dimming signal to the load unit.

The above emergency power source power acquisition module uses a manual input device to provide an artificially set value of the emergency power source or a rated output power of the emergency power source and input it to the dimming signal generation module.

The above emergency power source power acquisition module uses a wired/wireless communication device for wired/wireless communication with the emergency power source, receives power information of the emergency power source (an actual output power of the emergency power source or the rated power of the emergency power source) sent from the emergency power source, and sends the power information as $P_{source}$ to the dimming signal generation module.

The above load unit power acquisition module uses a first power detection device to detect an input voltage and an input current of the load unit in the mains power state, obtains a power by calculation based on this, and then sends the power as load $P_{load}$ to the dimming signal generation module.

The above load unit power acquisition module includes a second power detection device, a storage device, and a comparison device. The second power detection device is configured to detect an actual power of the load unit in real time in the mains power state and send it to the comparison device. The comparison device is configured to compare a real-time power value detected by the second power detection device with the highest historical power value stored in the storage device, and replace the highest historical power value with the real-time power value when the real-time power value is higher than the highest historical power value. The storage module is configured to send currently stored power data as $P_{load}$ to the dimming signal generation module.

The above load unit power acquisition module uses a wired/wireless communication device for wired/wireless communication with the load unit, receives power information of the load unit (the actual power of the load unit or a rated power of the load unit) sent from the load unit, and sends the power information as $P_{load}$ to the dimming signal generation module.

The above wireless communication method uses Bluetooth, WiFi, Zigbee or EnOcean.

The above wired communication method uses DALI, KNX, CAN, RS232, RS485, USB or power line carrier.

The above dimming signal generation module includes a receiving module, a controller, a bypass switch for a mains power dimming device, and a dimming unit. The receiving module is configured to receive the $P_{source}$ sent from the emergency power source power acquisition module and the $P_{load}$ sent from the load unit power acquisition module respectively, and send them to the controller. The controller calculates the dimming ratio K according to $K=P_{source}/P_{load}$, and controls the dimming unit to output a dimming signal to the load unit according to the dimming ratio K. The controller also controls on and off states of the bypass switch for the mains power dimming device, so as to bypass and invalidate the mains power dimming device in case that the maximum power of the load unit is detected in the emergency state and the mains power state.

The above dimming unit uses a dimming signal generator to generate a TriAC, PWM, 0-10V, Dali or DMX dimming signal according to the dimming ratio K and send it to the load unit.

A dimming emergency inverter includes the dimmer as described above, a line control module, a charging module, a DC/AC conversion module, and a battery pack. The load power acquisition module in the dimmer is connected to the load unit, and the line control module provides the following paths: in a mains power state, the line control module connects the load power acquisition module in the dimmer to the mains power to realize power supply from the mains power to the load unit, and the line control module also connects the charging module to the mains power, whereas the other end of the charging module is connected to the battery pack to realize the charging of the battery pack by the mains power; and in an emergency state, the line control module connects the load power acquisition module in the dimmer to the DC/AC conversion module, and the other end of the DC/AC conversion module is connected to the battery pack to realize power supply from the battery pack to the load unit.

An emergency lighting system includes the dimming emergency inverter as described above, and a load unit that provides emergency lighting. The dimming emergency inverter provides emergency power supply to the load unit in an emergency state.

With the adoption of the above solutions, by acquiring power data of the load unit in the mains power state according to the present disclosure, the rated output power of the emergency power source is acquired in the mains power state or at the instant when the mains power state is switched to the emergency state, so that the dimming signal generation module can acquire the dimming ratio through a simple proportional operation at the instant when the mains power state is switched to the emergency state at the latest to obtain a power supply solution, thereby maintaining the load unit in a lighted state. As compared with the existing power supply solutions, the required response time is greatly shortened, and the function of emergency lighting device is really realized.

DETAILED DESCRIPTION OF THE EMBODIMENT(S) OF THE INVENTION

Technical solutions and advantageous effects of the present disclosure will be described in detail below with reference to the accompanying drawings.

Figure 1:
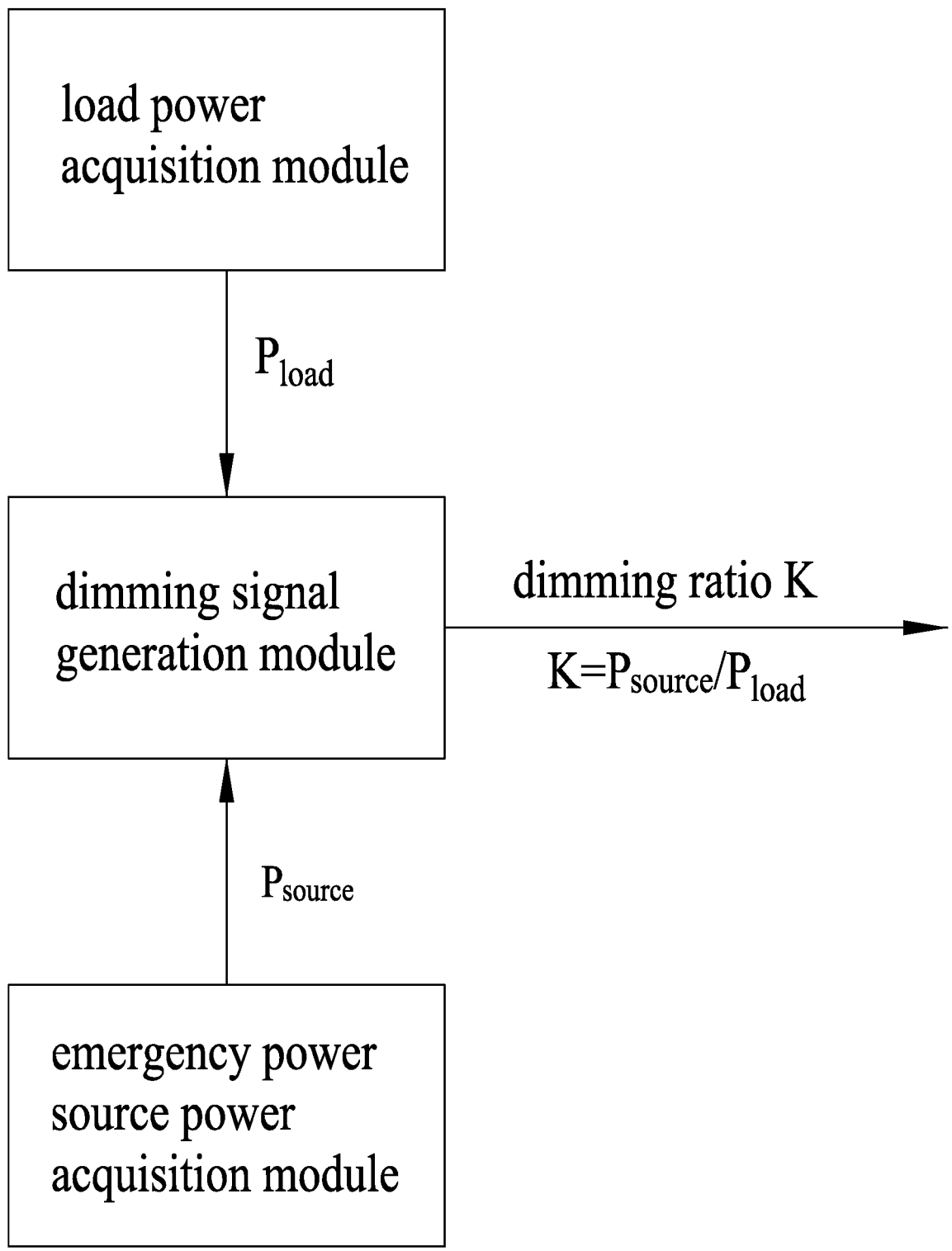
FIG. 1 is an overall principle diagram of a dimming method according to the present disclosure.

As shown in FIG. 1, the present disclosure provides a dimming method, in which when a mains power state is switched to an emergency state, a dimming signal is generated according to a dimming ratio K to perform dimming control on a load unit, the dimming signal being a TriAC, PWM, 0-10V, Dali or DMX dimming signal; wherein the dimming ratio K is calculated as follows:

$$K=P_{source}/P_{load};$$

wherein $P_{source}$ is an output power of an emergency power source, and may be a rated output power of the emergency power source. Specifically, $P_{source}$ may be acquired through calculation using a nominal value of the emergency power source, or through wired/wireless communication with the emergency power source. $P_{source}$ may also be set artificially according to actual lighting demand; and $P_{load}$ is the power of the load unit acquired in the mains power state, which may be an actual power of the load unit and acquired through detection in the mains power state. Considering that in the mains power state, a working power of the load unit may vary, $P_{load}$ may also be a maximum actual power of the load unit in the mains power state; $P_{load}$ may also be a rated power of the load unit, and is acquired through wired/wireless communication with the load unit based on the communication function of the current load unit.

Figure 2:
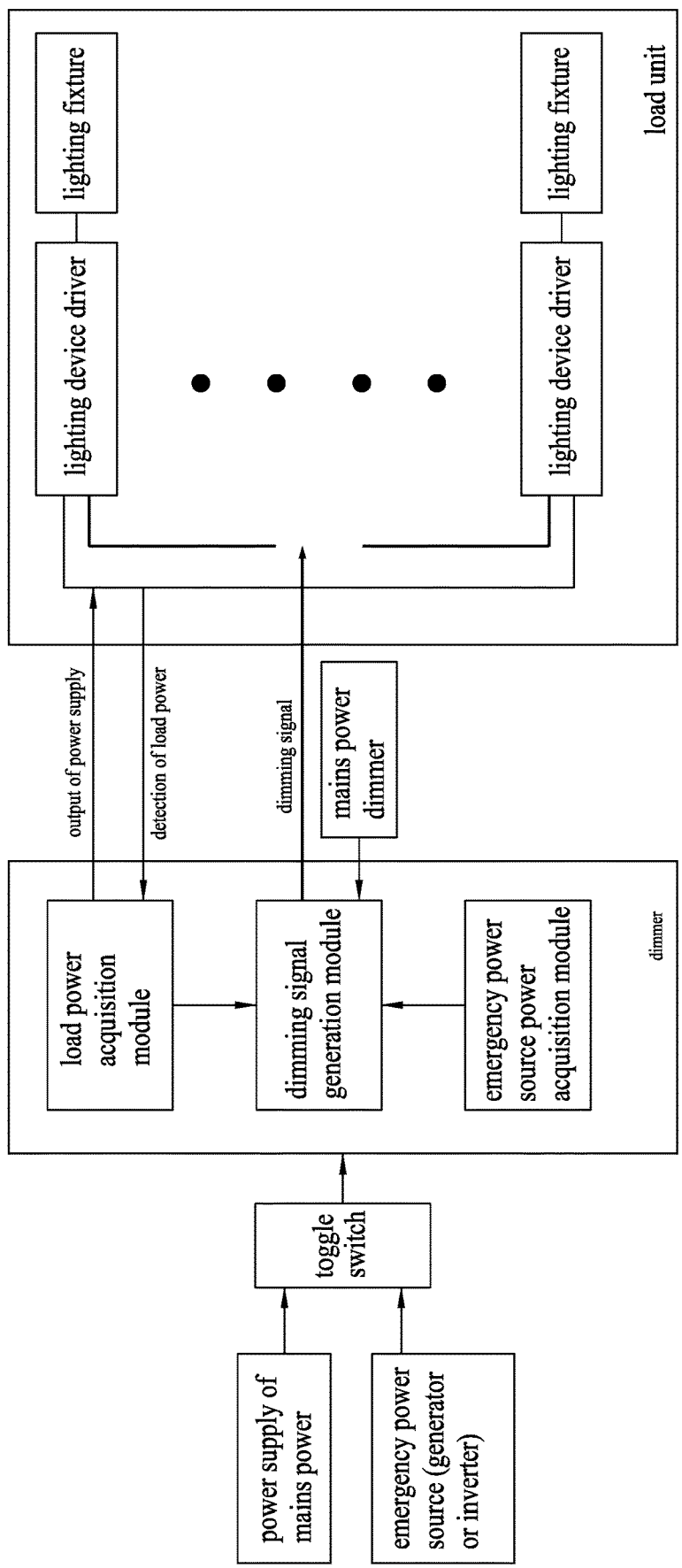
FIG. 2 is an implementation principle diagram of a dimmer according to the present disclosure.
Figure 3:
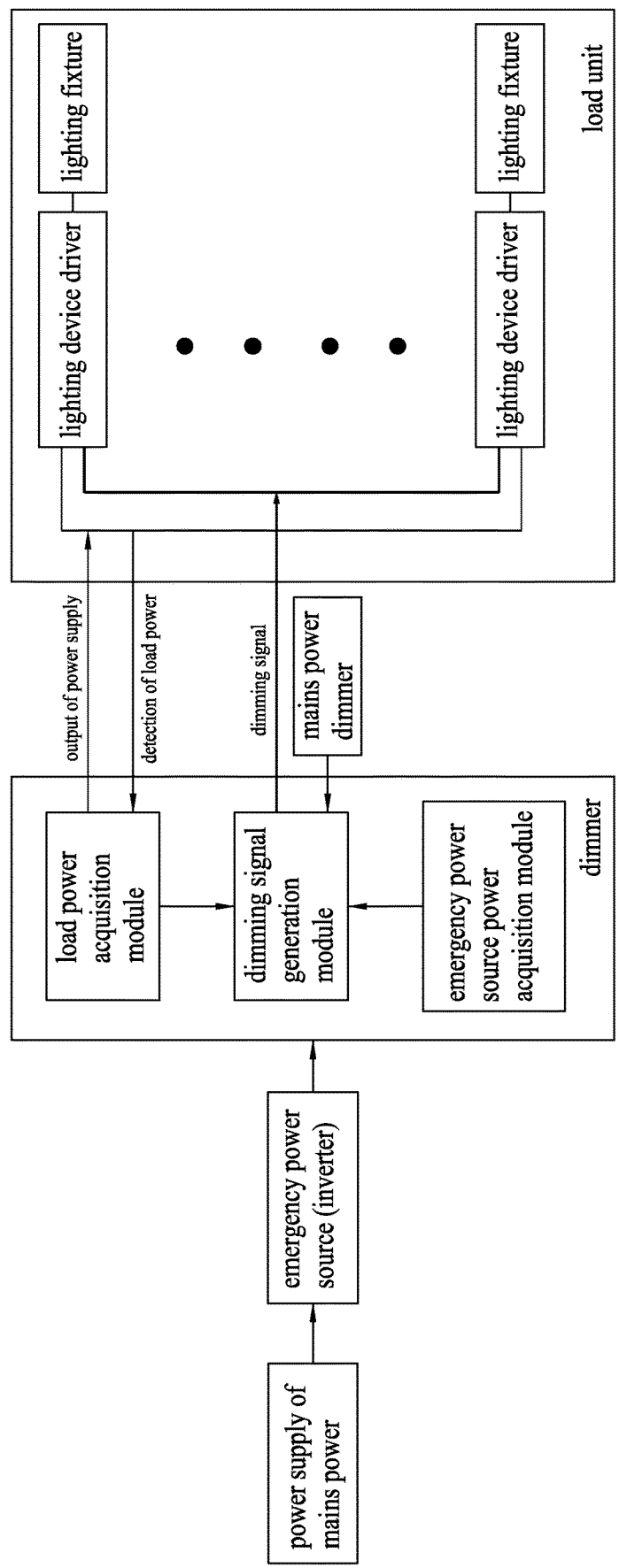
FIG. 3 is another implementation principle diagram of a dimmer according to the present disclosure.

As shown in FIG. 1, a dimmer provided by the present disclosure is applied to the emergency lighting system shown in FIG. 2 and FIG. 3. The emergency lighting system includes: an emergency power source configured to provide emergency power supply in an emergency state, a dimmer that allocates an output power of the emergency power source based on a certain power allocation scheme, and a load unit that provides emergency lighting according to the power allocated by the dimmer. In particular, the load unit includes a lighting fixture and a lighting device driver for driving the lighting fixture.

The dimmer provided by the present disclosure includes an emergency power source power acquisition module, a load unit power acquisition module, and a dimming signal generation module, which will be explained below respectively.

Figure 5:
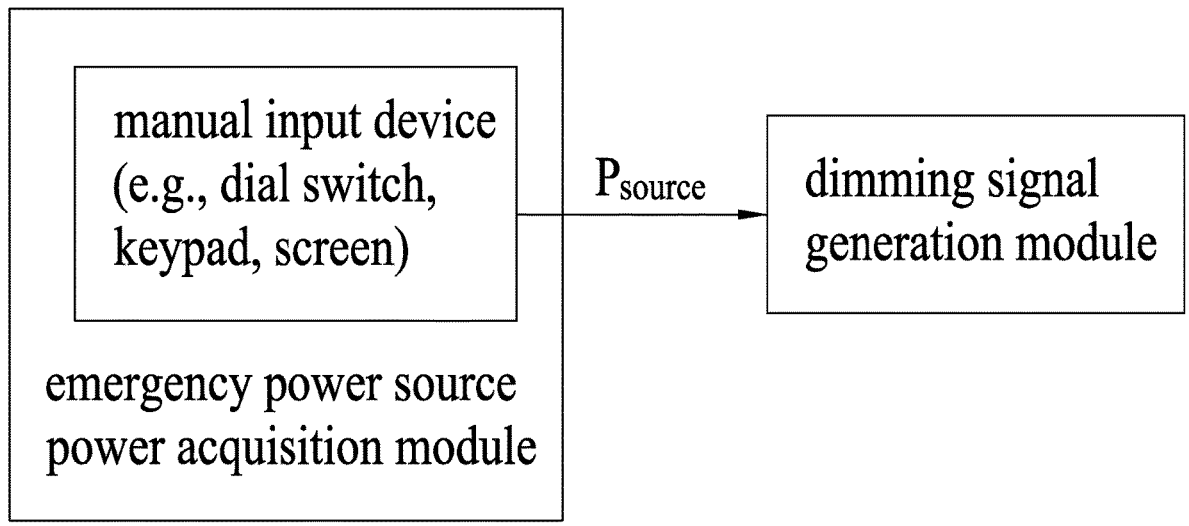
FIG. 5 is an implementation principle diagram of an emergency power source power acquisition module in the present disclosure.
Figure 6:
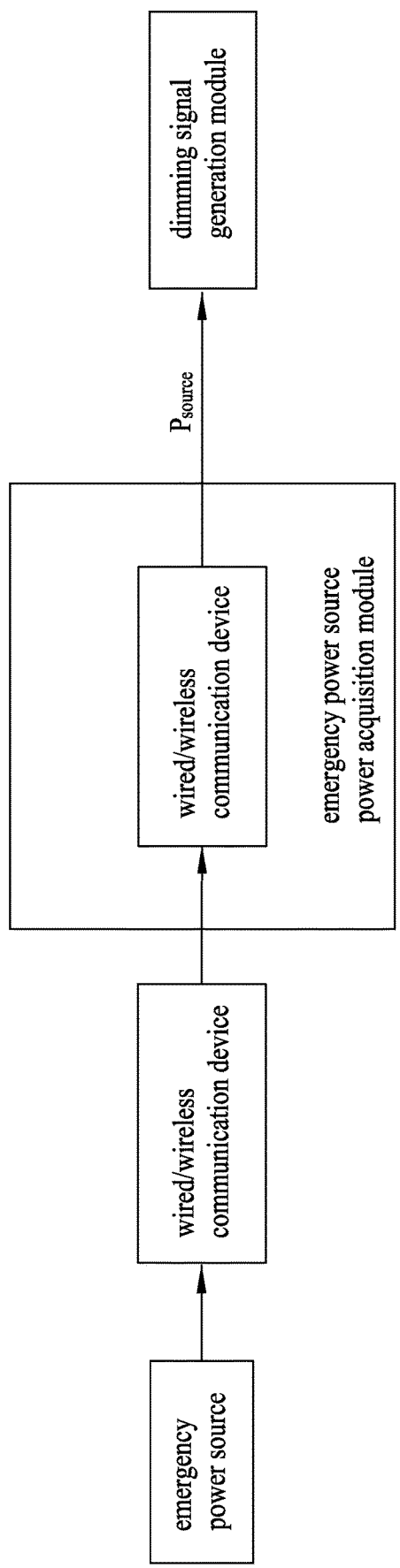
FIG. 6 is another implementation principle diagram of an emergency power source power acquisition module in the present disclosure.

The emergency power source power acquisition module is configured to acquire an output power $P_{source}$ of an emergency power source and send it to the dimming signal generation module. In a specific implementation, the emergency power source power acquisition module may be designed as the structure of a manual input device shown in FIG. 5, wherein a rated output power of the emergency power source may be acquired by an operator through a nameplate of the emergency power source or other means, and the rated output power is input through the manual input device; the emergency power source power acquisition module may also be designed as the structure of the manual input device shown in FIG. 5, wherein the operator sets the output power of the emergency power source when the mains power state is switched to the emergency state according to actual lighting requirements or load conditions, or according to actual output conditions of the emergency power source, and inputs it through the manual input device; considering that some emergency power sources are equipped with the communication function, the emergency power source power acquisition module may be even designed as the structure of the wired/wireless communication device shown in FIG. 6. The power information of the emergency power source (which may be the rated output power or the actual power, and may be set as required) may be transmitted to the dimming signal generation module through wired or wireless communication.

The load unit power acquisition module is configured to acquire a power $P_{load}$ of a load unit in the mains power state and send it to the dimming signal generation module. In a specific implementation, the load unit power acquisition module may be implemented in the following several forms.

Figure 7:
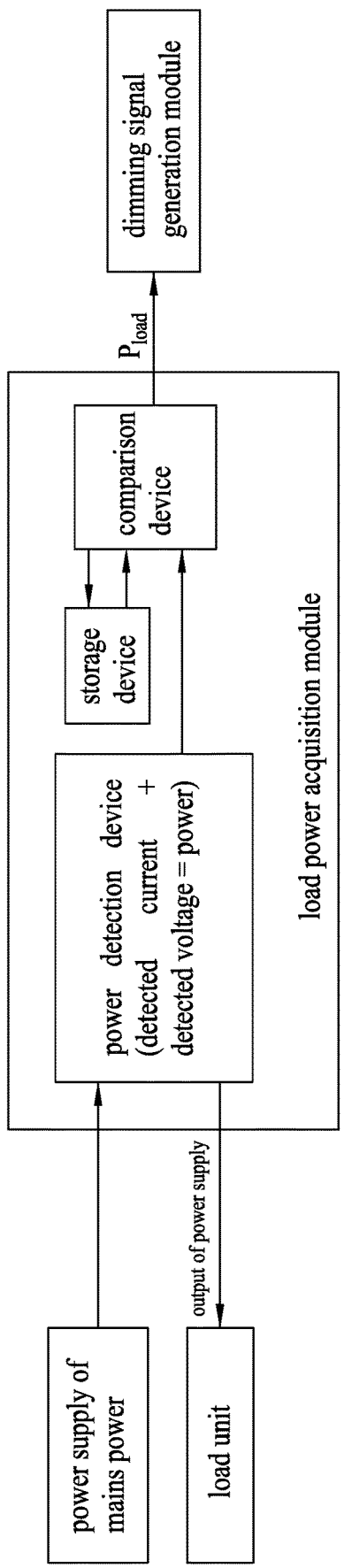
FIG. 7 is an implementation principle diagram of a load unit power acquisition module in the present disclosure.

First implementation form: As shown in FIG. 7, the load unit power acquisition module uses a power detection device to detect the power supply input voltage and input current of the load unit in the mains power state, thereby calculating the actual power of the load unit, which can then be used as the power $P_{load}$ of the load unit and sent to the dimming signal generation module.

Figure 8:
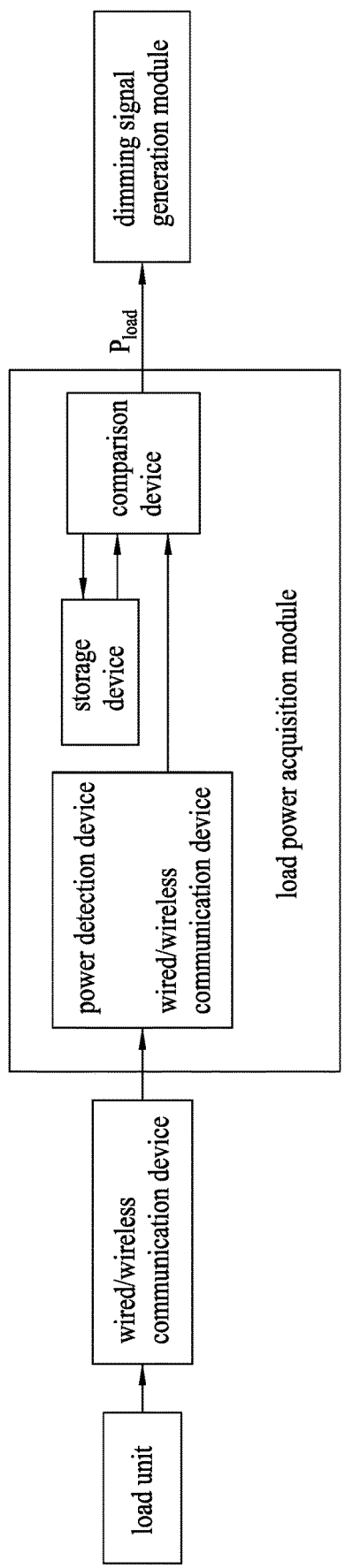
FIG. 8 is another implementation principle diagram of a load unit power acquisition module in the present disclosure.

Second implementation form: As shown in FIG. 8, the load unit power acquisition module uses a wired/wireless communication device to perform wired communication with all lighting fixtures connected to the load unit, and each lighting fixture transmits its rated power data to the wired/wireless communication device through wired transmission (DALI, KNX, CAN, RS232, RS485, USB, power line carrier (PLC), etc.) or wireless transmission (Bluetooth, WiFi, Zigbee, EnOcean, etc.). After the wired/wireless communication device performs a summing operation on the rated power data, the data is sent to the dimming signal generation module. Alternatively, all the received rated power data is sent to the dimming signal generation module, and after the dimming signal generation module performs a summing operation on all the rated power data, the data is used as the power $P_{load}$ of the load unit.

As mentioned earlier, the load unit power acquisition module may detect the working power of the load unit in real time and use it as the power $P_{load}$ of the load unit. However, in practice, the number of lighting fixtures connected to the load unit may vary, and the actual working power of each lighting fixture may also change, thus causing the working power of the load unit to fluctuate during the detection process. In order to be as close to the actual working situation as possible, as shown in FIGS. 7 and 8, in addition to the inclusion of the power detection device for real-time detection of the working power of the load unit, the load unit power acquisition module may also be provided with a storage device and a comparison device. The power detection device detects the actual working power of the load unit in real time in the mains power state and sends it to the comparison device. The comparison device compares the real-time power value detected by the power detection device with the highest historical power value stored in the storage device, and replaces the highest historical power value with the real-time power value when the real-time power value is higher than the highest historical power value. The storage module sends currently stored power data as load P to the dimming signal generation module.

Figure 9:
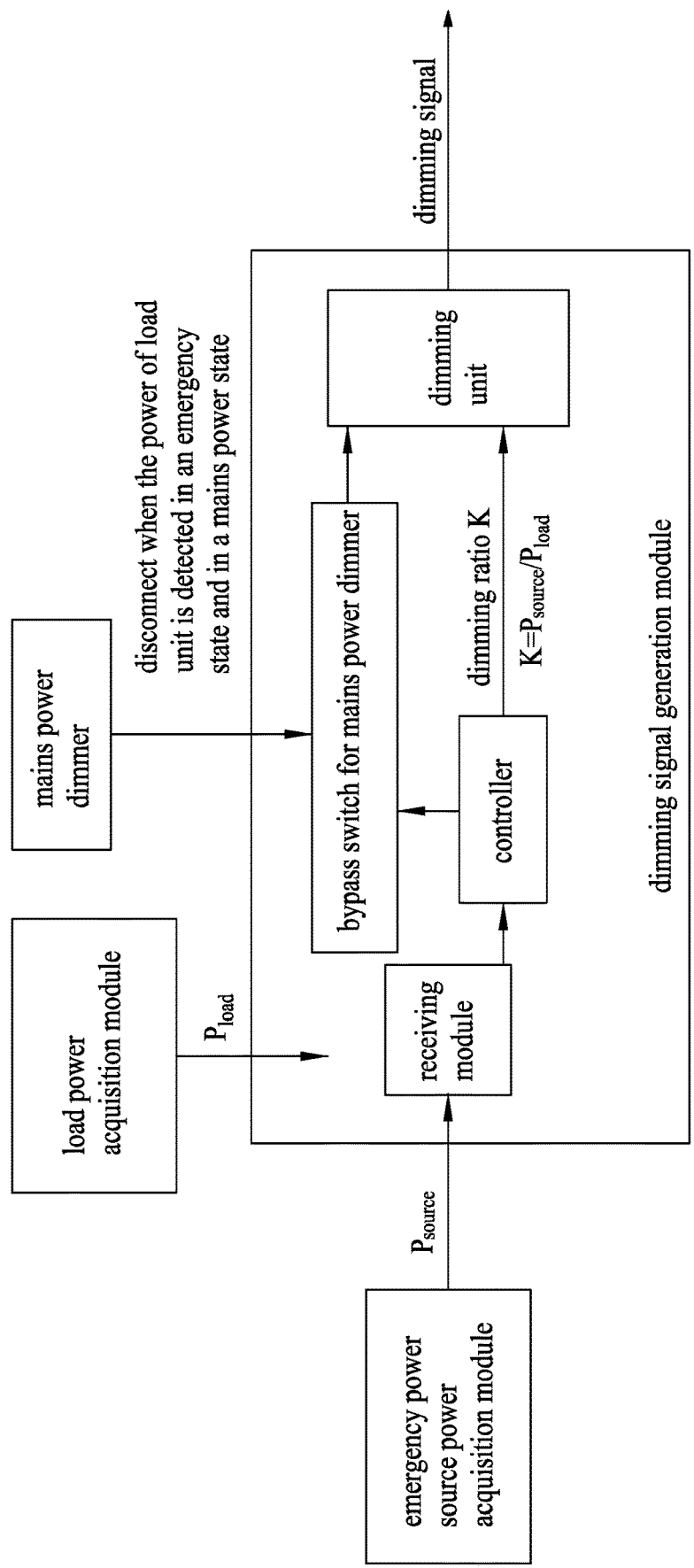
FIG. 9 is an implementation principle diagram of a dimming signal generation module in the present disclosure.

The dimming signal generation module includes a receiving module, a controller, a bypass switch for a mains power dimming device, and a dimming unit, as shown in FIG. 9. The receiving module is configured to receive the $P_{source}$ sent from the emergency power source power acquisition module and the $P_{load}$ sent from the load unit power acquisition module respectively, and send them to the controller. The controller calculates the dimming ratio K according to $K=P_{source}/P_{load}$, and controls the dimming unit to output a dimming signal to the load unit according to the dimming ratio K. The controller also controls on and off states of the bypass switch for the mains power dimming device, so as to bypass and invalidate the mains power dimming device in case that the maximum power of the load unit is detected in the emergency state and the mains power state. The dimming unit uses a dimming signal generator to generate a TriAC, PWM, 0-10V, Dali or DMX dimming signal according to the dimming ratio K and send it to the lighting device driver of the load unit.

Figure 4:
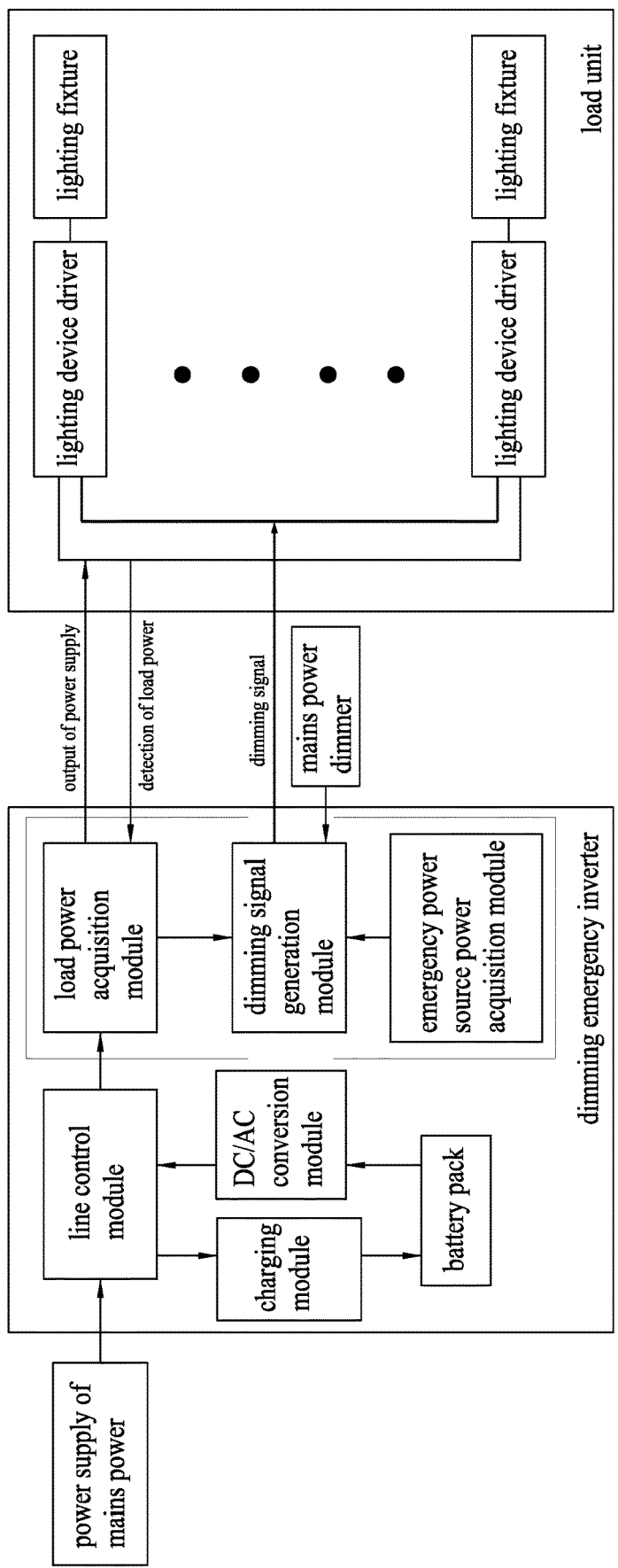
FIG. 4 is an implementation principle diagram of a dimming emergency inverter according to the present disclosure.

As shown in FIG. 4, the present disclosure also provides a dimming emergency inverter to which the above described dimming method is applied. In addition to the dimming emergency inverter configured to provide emergency power supply in an emergency state and to which the above described dimming method is applied, the emergency lighting system shown in FIG. 4 includes a load unit for providing emergency lighting. In particular, the load unit includes a lighting fixture and a lighting device driver for driving the lighting fixture.

The above description merely relates to embodiments of the present disclosure, and is not intended to limit the design of the present disclosure. Any equivalent changes made according to key points of the design of the present disclosure will fall within the scope of protection of the present disclosure.

What is claimed is:

1. A dimming method, in which when a mains power state is switched to an emergency state, a dimming ratio K is used to perform dimming control on a load unit; wherein the dimming ratio K is calculated as follows: $K=P_{source}/P_{load}$; and
wherein $P_{source}$ is an output power of an emergency power source, and $P_{load}$ is the power of the load unit acquired in the mains power state.

2. The dimming method according to claim 1, wherein the $P_{source}$ is an artificially set value, a rated output power of the emergency power source or an actual output power of the emergency power source; the rated output power of the emergency power source is acquired through a nominal value of the emergency power source, or through wired/wireless communication with the emergency power source; and the actual output power of the emergency power source is acquired through wired/wireless communication with the emergency power source.

3. The dimming method according to claim 1, wherein the load $P_{load}$ is an actual power of the load unit, and is acquired through detection in the mains power state, or acquired through wired/wireless communication with the load unit.

4. The dimming method according to claim 1, wherein the $P_{load}$ is a maximum actual power of the load unit in the mains power state, and is acquired through detection.

5. The dimming method according to claim 1, wherein the load $P_{load}$ is a rated power of the load unit, and is acquired through wired/wireless communication with the load unit.

6. The dimming method according to claim 1, wherein the specific method of using the dimming ratio K to perform dimming control on the load unit is: generating a dimming signal according to the dimming ratio K to control the load unit.

7. The dimming method according to claim 6, wherein the dimming signal is a TriAC, PWM, 0-10V, Dali or DMX dimming signal.

8. A dimmer, configured to dim a load unit powered by an emergency power source in an emergency state and comprising:
an emergency power source power acquisition module, configured to acquire an output power $P_{source}$ of an emergency power source;
a load unit power acquisition module, configured to acquire a power $P_{load}$ of a load unit in a mains power state; and
a dimming signal generation module, configured to acquire a dimming ratio according to $K=P_{source}/P_{load}$ when the mains power state is switched to an emergency state, generate a dimming signal according to the dimming ratio K, and output the dimming signal to the load unit.

9. The dimmer according to claim 8, wherein the emergency power source power acquisition module uses a manual input device to provide an artificially set value of the emergency power source or a rated output power of the emergency power source and input it to the dimming signal generation module.

10. The dimmer according to claim 8, wherein the emergency power source power acquisition module uses a wired/wireless communication device for wired/wireless communication with the emergency power source, receives power information of the emergency power source sent from the emergency power source, and sends the power information as $P_{source}$ to the dimming signal generation module.

11. The dimmer according to claim 8, wherein the load unit power acquisition module uses a first power detection device to detect an input voltage and an input current of the load unit in the mains power state, obtains a power by calculation based on this, and then sends the power as $P_{load}$ to the dimming signal generation module.

12. The dimmer according to claim 8, wherein the load unit power acquisition module comprises a second power detection device, a storage device, and a comparison device; the second power detection device is configured to detect an actual power of the load unit in real time in the mains power state and send it to the comparison device; the comparison device is configured to compare a real-time power value detected by the second power detection device with the highest historical power value stored in the storage device, and replace the highest historical power value with the real-time power value when the real-time power value is higher than the highest historical power value; and the storage module is configured to send currently stored power data as $P_{load}$ to the dimming signal generation module.

13. The dimmer according to claim 8, wherein load unit power acquisition module uses a wired/wireless communication device for wired/wireless communication with the load unit, receives power information of the load unit sent from the load unit, and sends the power information as $P_{load}$ to the dimming signal generation module.

14. The dimmer according to claim 13, wherein the wireless communication method uses Bluetooth, WiFi, Zigbee or EnOcean.

15. The dimmer according to claim 13, wherein the wired communication method uses DALI, KNX, CAN, RS232, RS485, USB or power line carrier.

16. The dimmer according to claim 8, wherein the dimming signal generation module comprises a receiving module, a controller, a bypass switch for a mains power dimming device, and a dimming unit; the receiving module is configured to receive the $P_{source}$ sent from the emergency power source power acquisition module and the $P_{load}$ sent from the load unit power acquisition module respectively, and send them to the controller; the controller calculates the dimming ratio K according to $K=P_{source}/P_{load}$, and controls the dimming unit to output a dimming signal to the load unit according to the dimming ratio K; and the controller also controls on and off states of the bypass switch for the mains power dimming device, so as to bypass and invalidate the mains power dimming device in case that the maximum power of the load unit is detected in the emergency state and the mains power state.

17. The dimmer according to claim 16, wherein the dimming unit uses a dimming signal generator to generate a TriAC, PWM, 0-10V, Dali or DMX dimming signal according to the dimming ratio K and send it to the load unit.

18. A dimming emergency inverter, comprising the dimmer according to claim 8, a line control module, a charging module, a DC/AC conversion module, and a battery pack; wherein the load power acquisition module in the dimmer is connected to the load unit, and the line control module provides the following paths: in a mains power state, the line control module connects the load power acquisition module in the dimmer to the mains power to realize power supply from the mains power to the load unit, and the line control module also connects the charging module to the mains power, whereas the other end of the charging module is connected to the battery pack to realize the charging of the battery pack by the mains power; and in an emergency state, the line control module connects the load power acquisition module in the dimmer to the DC/AC conversion module, and the other end of the DC/AC conversion module is connected to the battery pack to realize power supply from the battery pack to the load unit.

19. An emergency lighting system, comprising the dimming emergency inverter according to claim 18, and a load unit that provides emergency lighting, wherein the dimming emergency inverter provides emergency power supply to the load unit in an emergency state.

* * * * *